(12) United States Patent
Feng et al.

(10) Patent No.: US 6,564,670 B2
(45) Date of Patent: May 20, 2003

(54) BICYCLE SPEED CONTROL APPARATUS

(75) Inventors: Chan-Hua Feng, Chiai Hsien (TW); Jen-Ji Wang, Changhua Hsien (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/817,705

(22) Filed: Mar. 26, 2001

(65) Prior Publication Data

US 2001/0042421 A1 Nov. 22, 2001

(30) Foreign Application Priority Data

May 19, 2000 (TW) .................................. 89208455 0 U

(51) Int. Cl.$^7$ ................................................ F16C 1/10
(52) U.S. Cl. ...................................... 74/502.2; 74/489
(58) Field of Search .............................. 74/502.2, 489, 74/142, 473.13

(56) References Cited

U.S. PATENT DOCUMENTS

| | | | | |
|---|---|---|---|---|
| 5,213,005 A | * | 5/1993 | Nagano, Masashi | 74/502.2 |
| 5,287,766 A | | 2/1994 | Nagano | 74/502.2 |
| 5,307,706 A | * | 5/1994 | Nagano | 74/502.2 |
| 5,438,889 A | | 8/1995 | Tagawa | 74/475 |
| 5,660,083 A | * | 8/1997 | Huang et al. | 74/502.2 |
| 5,673,594 A | * | 10/1997 | Huang et al. | 74/473.13 |
| 5,730,030 A | * | 3/1998 | Masui | 74/473.13 |
| 5,732,593 A | * | 3/1998 | Hwang et al. | 74/142 |

FOREIGN PATENT DOCUMENTS

TW      276229      1/1995

* cited by examiner

*Primary Examiner*—Matthew C. Graham
*Assistant Examiner*—Mariano Sy
(74) *Attorney, Agent, or Firm*—Fish & Richardson P.C.

(57) ABSTRACT

A bicycle speed control apparatus for controlling a gear transmission mechanism via a drive cable connected to a bicycle is disclosed. The bicycle speed control apparatus includes a first seat connected to a bicycle handlebar and a second seat having a shaft used to connect to the first seat. A cylindrical sleeve member is used to connect to the drive cable and provided with first teeth, second teeth and third teeth in parallel. A first shifting lever and a second shifting lever are provided to pivot on the shaft. A first pawl and a second pawl are provided to movably mount on the first shifting lever and the second shifting lever, respectively. A resilient member is used to position on the shaft so as to engage the third teeth and disengage the first pawl from the first teeth and disengage the second pawl from the second teeth.

15 Claims, 13 Drawing Sheets

BICYCLE SPEED CONTROL APPARATUS

BACKGROUND OF THE INVENTION

1. Field of the Invention

This invention relates to a bicycle speed control apparatus. More particularly, this invention relates to a bicycle speed control apparatus provided with a pair of shifting levers to control a gear transmission mechanism via a drive cable.

2. Description of Prior Art

U.S. Pat. No. 5,287,766 is disclosed with a speed control apparatus that is provided with a shift lever attached to the handlebar of a bicycle so as to control a derailleur (not shown). It is quite simple to produce the shift lever and assemble it with other elements. Because the shifter is positioned by frictional force, the shifter is easily disengaged and the chain cannot be appropriately positioned when the bicycle passes over an uneven road. Thus, the rider often feels discomfort on his/her palm because of the excessive shifting range generated by the single shift lever during the shifting process.

In U.S. Pat. No. 5,438,889, the driving force acted on the lever portion of the shifter has to be generated by the external pulley assembly (cable winding reel (16), drive reel portion (16) and the drive cable (K)), and therefore the driving force cannot be precisely controlled and the shifter cannot be properly positioned at a predetermined site when it is pushed outside the range.

In Taiwan Patent No. 276229 discloses two complicate mechanisms, each connected to the shifter and used to determine the movement of the shifter. Because the assembled mechanisms can be provided with larger driving force, the cable connected between the shifter and the two complicate mechanisms gradually extends over time. Then, the tract of the shift gradually becomes insufficient and the shifting process may be interrupted unexpectedly.

SUMMARY OF THE INVENTION

To solve the above problem, the primary object of this invention is to provide a bicycle speed control apparatus so as to shift precisely a gearbox or a gear transmission mechanism of a bicycle through a drive cable. The bicycle speed control apparatus of the present invention comprises a first seat connected to a bicycle handlebar, and a second seat provided with a shaft connected to the first seat so as to construct the main structure thereof. A cylindrical sleeve member is movably disposed about the shaft and connected to the end of a drive cable. The cylindrical sleeve member has an inner wall provided with first teeth, second teeth and third teeth, the third teeth located between the first teeth and the second teeth in parallel. A first shifting lever and a second shifting lever for respectively shifting a front and rear speed shifter of the gear transmission mechanism, are provided to pivot on the shaft, each of which having a hole used for receiving the shaft. A first pawl and a second pawl are provided to movably mount on the first shifting lever and the second shifting lever, respectively. The first pawl is formed with a first thrust end so as to engage the first teeth, and the second pawl is formed with a second thrust end so as to engage the second teeth. A resilient member positioned on the shaft so as to engage the third teeth and disengage the first pawl from the first teeth and disengaging the second pawl from the second teeth. The resilient member has a first protrusion for pressing the first pawl to disengage from the first teeth and a second protrusion for pressing the second pawl to disengage from the second teeth and a third protrusion for engaging the third teeth. A regulator is connected to and adjusts the tension of the drive cable.

BRIEF DESCRIPTION OF THE DRAWINGS

The present invention can be more fully understood by reading the subsequent detailed description and examples with reference made to accompanying drawings in which.

DETAILED DESCRIPTION OF THE PREFERRED EMBODIMENTS

First Embodiment

Figure 1A:
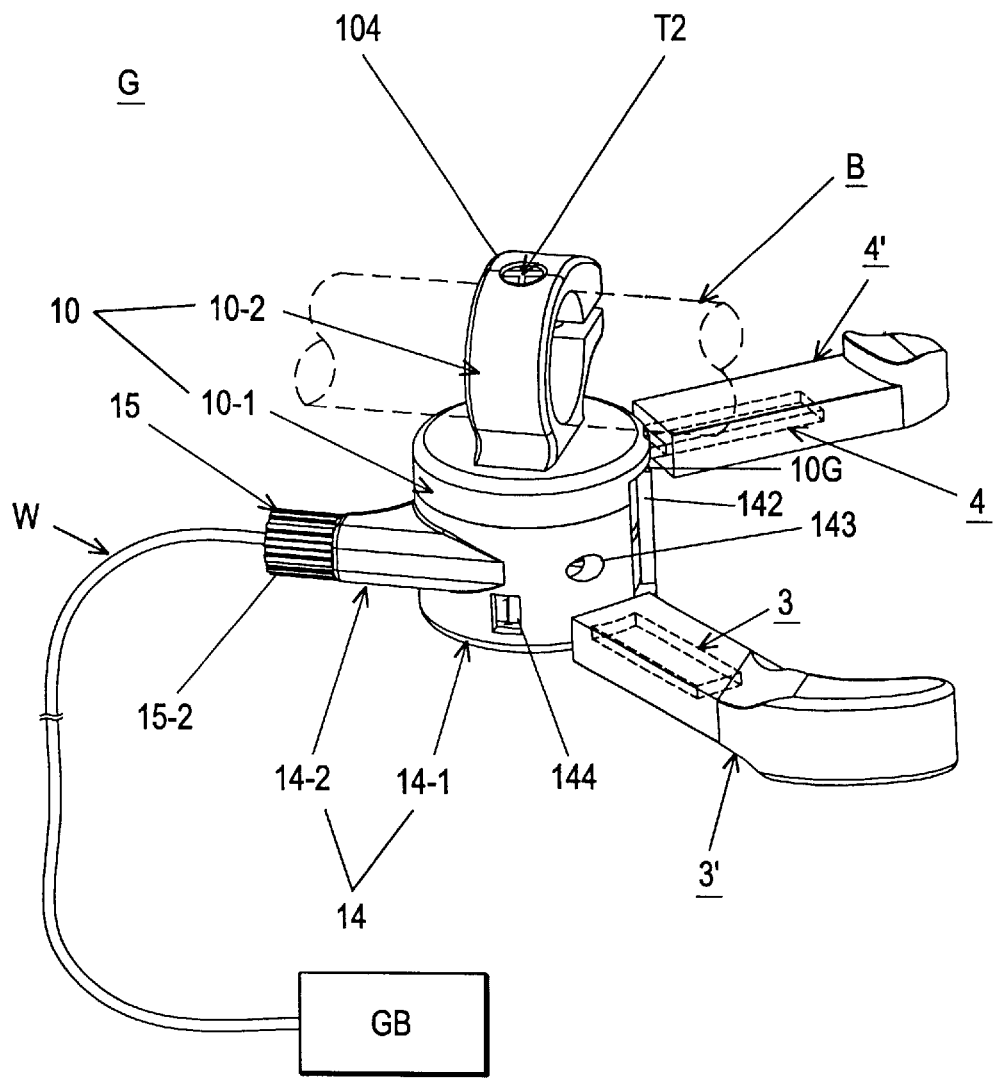
FIG. 1A is a perspective view showing the assembly of a bicycle speed control apparatus (G) according to a first embodiment of the present invention, which is mounted on a bicycle handlebar (B) and used to control a gear transmission mechanism (GB) through a drive cable (W)

FIG. 1A is a perspective view showing the assembly of a bicycle speed control apparatus G. The speed control apparatus G is mounted on a bicycle handlebar B and used to control a gear transmission mechanism GB through a drive cable W. The main structure of the bicycle speed control G is constructed by a first seat 10 and a second seat 14, wherein the first seat 10 is connected to the bicycle handlebar B and secured thereon by a bolt T2. A first shifting lever 3 wrapped with a rubber cover 3' and a second shifting lever 4 wrapped with a rubber cover 4' are both pivotally mounted between the first seat 10 and the second seat 14. The first shifting lever 3 and the second shifting lever 4 are respectively used to control a front shifter (not shown) and a rear speed shifter (not shown) of the gearbox GB. Therefore, the bicyclist can use two fingers to hold onto and move the first shifting lever 3 and the second shifting lever 4 about its axis, and the degree of the shift can be clearly seen by an opening 144 which is formed on the second seat 14.

Figure 1B:
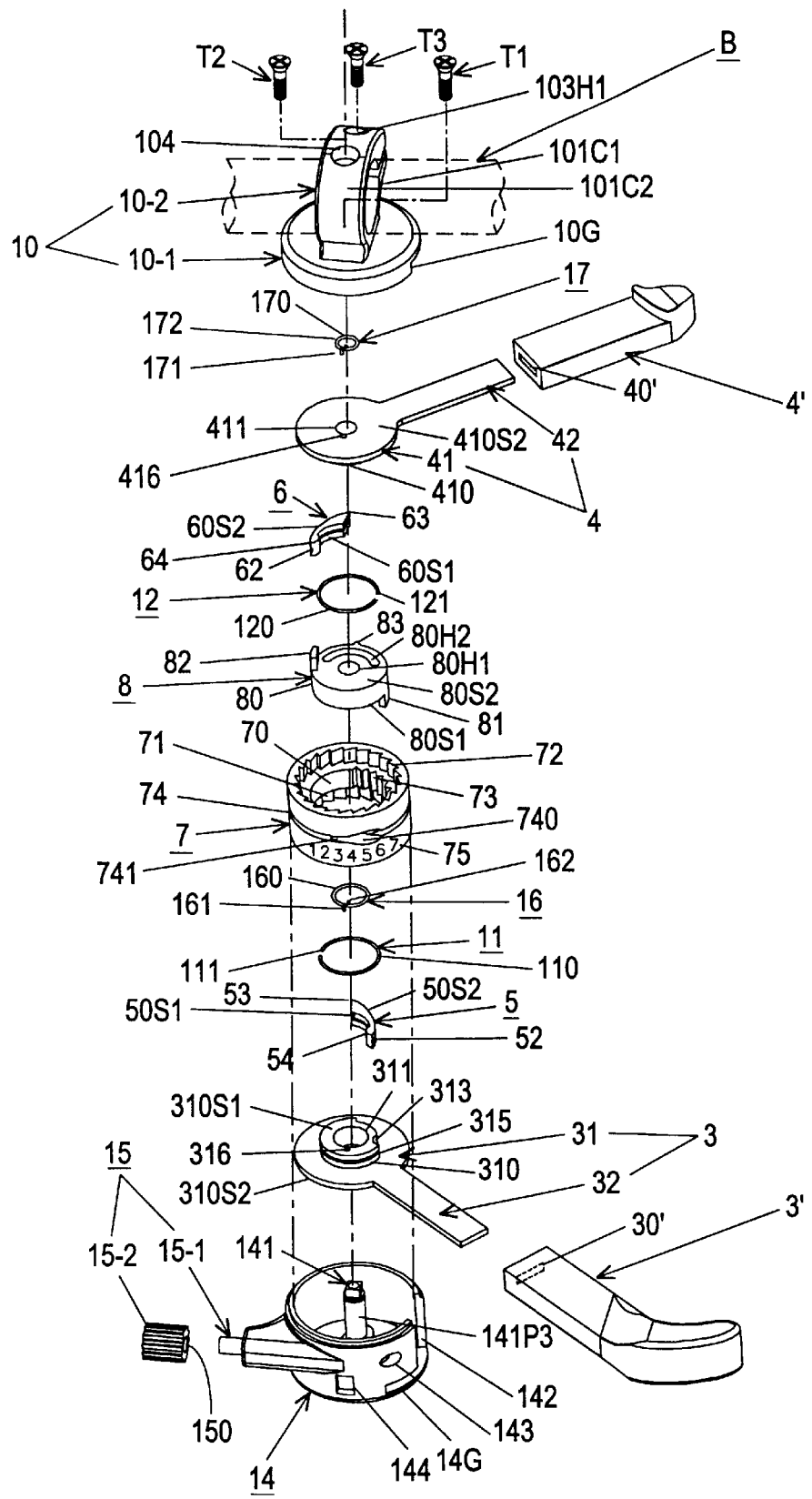
FIG. 1B is an exploded perspective view of FIG. 1A.
Figure 1C:
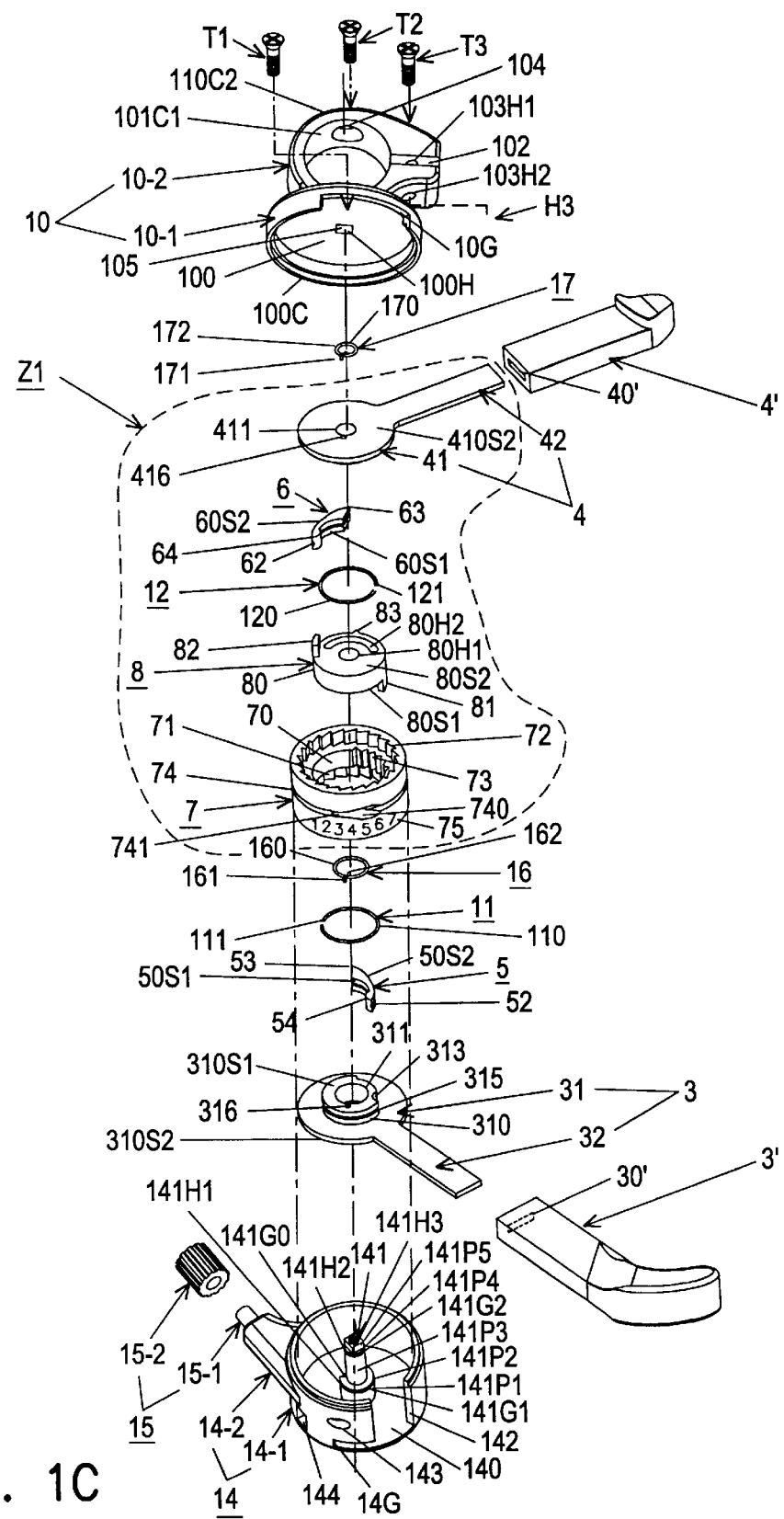
FIG. 1C is another perspective view with a different visual angle of FIG. 1B, for clearly seeing the structure of a first seat (10) and a second seat (14)

Referring also to FIG. 1B, an exploded perspective view shows the element of the speed control apparatus G of FIG. 1A. In addition to the aforementioned elements, the bicycle speed control G further comprises a cylindrical sleeve member 7, a first pawl 5 and a second pawl 6, a resilient member 8, a regulator 15, and two types of springs (denoted by symbols 11, 12 and symbols 16, 17). In FIG. 1C, a perspective view with a different visual angle of FIG. 1B shows more clearly about the inner structure of the first seat 10 and the second seat 14.

Figure 2A:
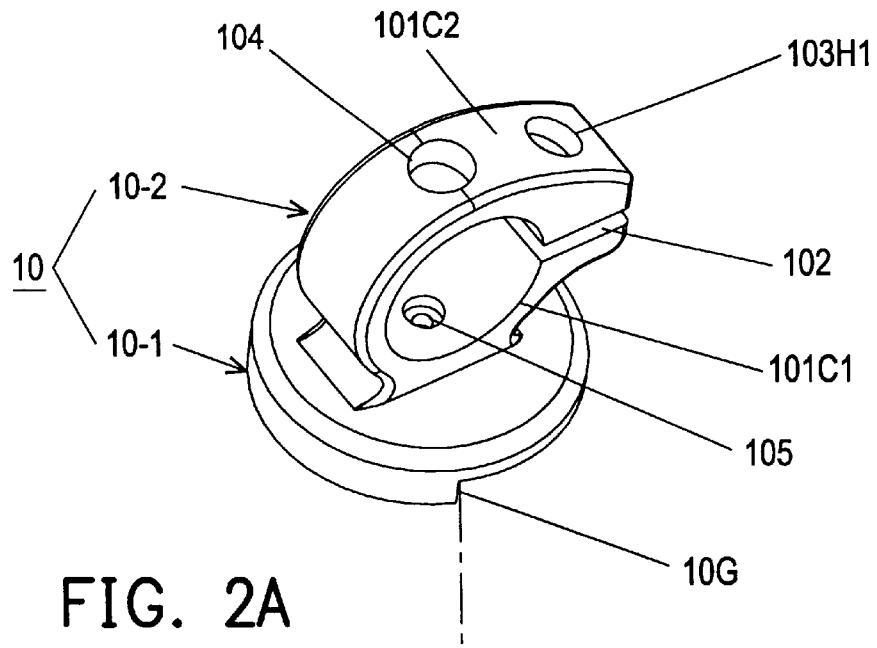
FIG. 2A is an enlarged perspective view of the first seat (10) of FIG. 1C.
Figure 2B:
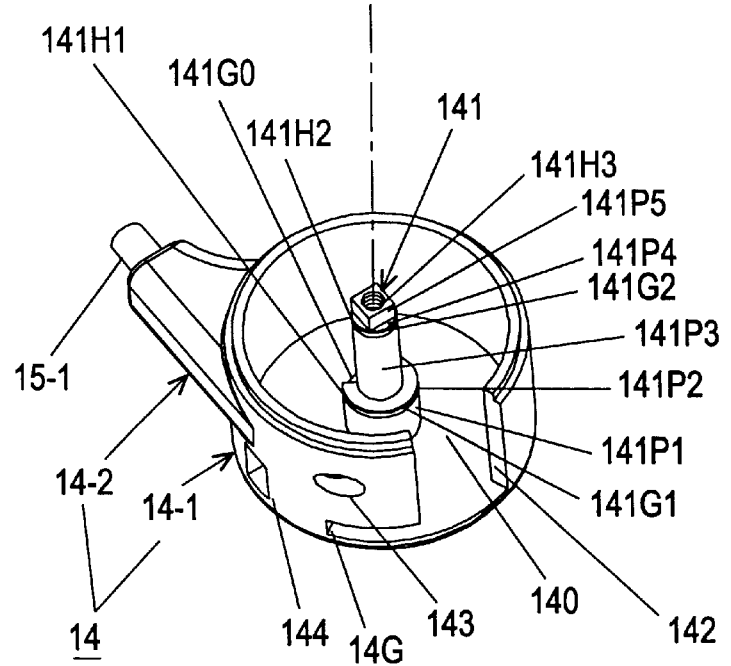
FIG. 2B is an enlarged perspective view of the second seat (14) of FIG. 1C.

Referring to FIG. 2A and FIG. 2B, two enlarged perspective views show the structure of the first seat 10 with different visual angles according to FIG. 1B and FIG. 1C, respectively.

Figure 3A:
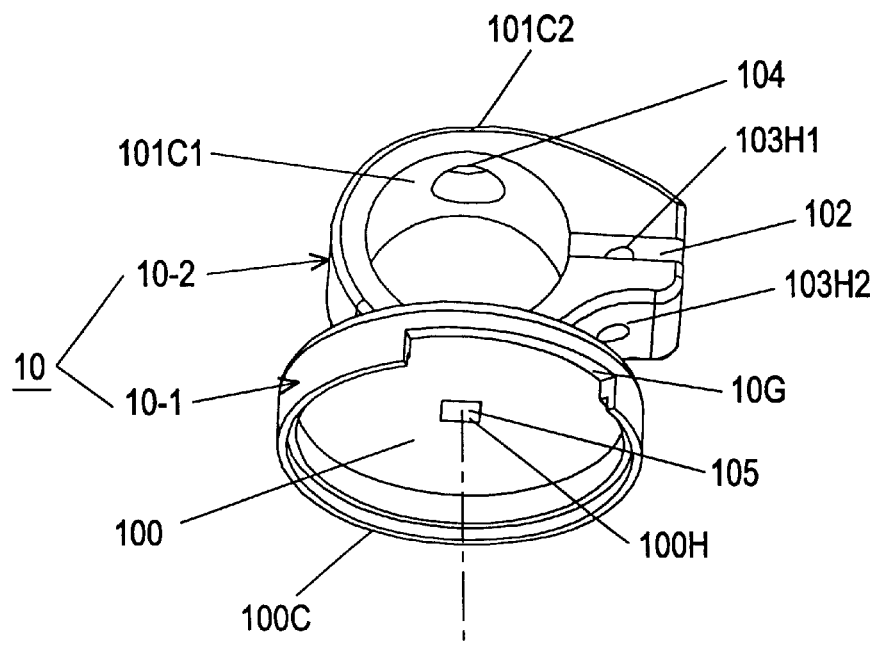
FIG. 3A is a perspective view of the first seat (10) with a different visual angle according to FIG. 2A.

As shown in FIG. 2A and FIG. 3A, the first seat 10 is composed of a disk-like connecting portion 10-1 and a cylindrical connecting portion 10-2. The cylindrical connecting portion 10-2 is a clamping frame used to directly connect to the handlebar B, and the disk-like connecting portion 10-1 is integrally formed with the cylindrical connecting portion 10-2 and used to connect to the second seat 14.

The cylindrical connecting portion 10-2 has an inner surface 101C1, an outer surface 101C2 and a slit 102 formed therebetween. The inner surface 101C is a annular surface used to directly mount on the handlebar B, and a hole 104 is penetrated from the outer surface 101C2 to the inner surface 101C1, and two holes 103H1 and 103H2 are penetrated from the outer surface 101C2 to the slit 102.

In FIG. 3A, the disk-like connecting portion 10-1 has a bottom surface 100 and an annular flange 100C formed with a curved recess 10G is formed on the circumferential of the bottom surface 100. A through hole 105 is penetrated from the inner surface 101C1 to the bottom surface 100, and the through hole 105 on bottom surface 100 is formed with a rectangular opening 100H.

Referring again to FIG. 1B, when the first seat 10 is properly fitted on the handlebar B, the handlebar B can be held tightly by screwing a bolt T3 on the holes 103H1, 103H2 to minimize the size of the slit 102. Further, a bolt T2 is used to connect the first seat 10 and the handlebar B by screwing on the predetermined hole (not shown in FIGS.) of the handlebar B through the hole 104 of the first seat 10. Thus, the speed control apparatus G can be properly fixed on the handlebar B by the bolt T2, T3 without movement or rotation.

Figure 3B:
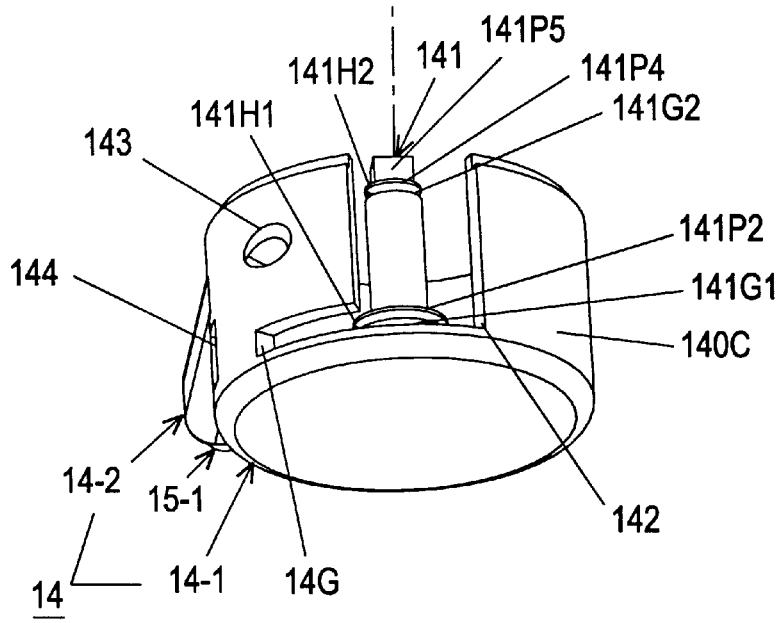
FIG. 3B is a perspective view of the second seat (10) with a different visual angle according to FIG. 2B.

Referring to FIG. 2B and FIG. 3B, two enlarged perspective views show the structure of the second seat 14 with different visual angles according to FIG. 1B and FIG. 1C, respectively.

In FIG. 2B, the second seat 14 comprises a cylindrical container 14-1 formed with a curved wall 140C and a shaft 141 therein, and a bracket 14-2 extended outwardly from the curved wall 140C. The curved wall 140C is formed with an L-shaped slot 142 and two through holes 143, 144. The shaft 141 is upwardly formed on the middle of the bottom surface 140 of the container 14-1, and the curved wall 140C is located on the circumference of the bottom surface 140 of the container 14-1. The L-shaped slot 142 on the curved wall 140C is located next to the bottom surface 140 and therefore a guiding slit 14G is formed.

The shaft 141 is a multi-step shaft used as a gyro shaft of the first shifting lever 3 and the second shifting lever 4. From the root to the free end of the shaft 141, the geometrical structure of the shaft 141 is defined as 1) to 7) as following. 1) a first step portion 141P1; 2) a first curved groove 141G1 and two positioning holes 141H1; 3) a second step portion 141P2 formed with a notch 141G0; 4) a third step portion 141P3; 5) a second curved groove 141G2 and two positioning holes 141H2; 6) a fourth step portion 141P4; 7) a rectangular end 141P5 formed with a threaded hole 141H3. Owing to the visual angle, only one hole 141H1 and one hole 141H2 are shown in FIG. 2B.

Figure 4:
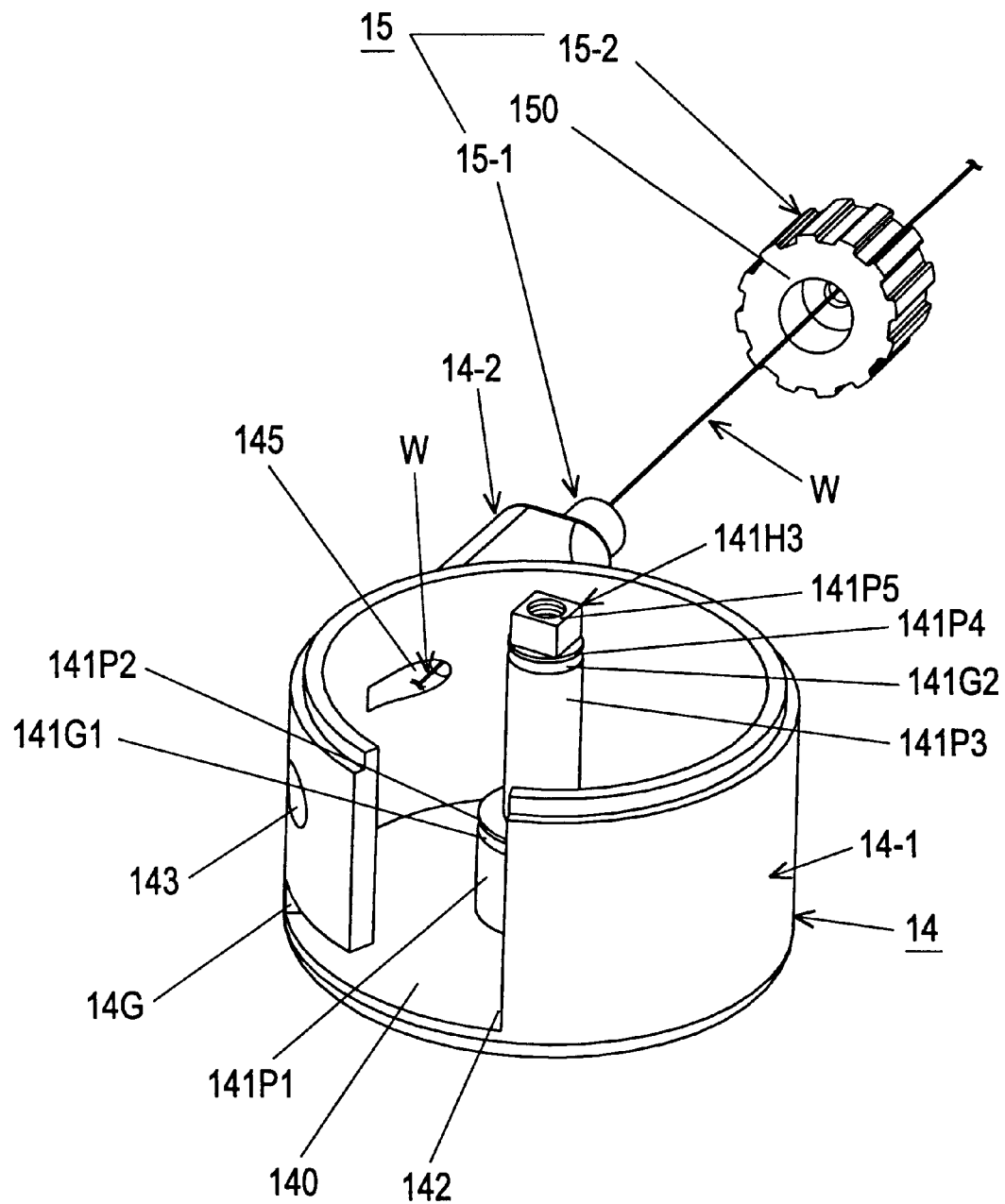
FIG. 4 is a perspective view showing the geometric relationship between the second seat (14) and the drive cable (W) which is control by a regulator (15)

Referring to FIG. 4, a perspective view shows the geometric relationship between the second seat 14, the regulator and the drive cable W.

The bracket 14-2 is formed with a channel 145 for the installation of the regulator 15. The regulator 15 has a threaded element 15-1 and a cylindrical sleeve 15-2 formed with a hole 150. The threaded element 15-1 is installed in the through channel 145 and used to control the tension of the drive cable W, and the hole 150 of the cylindrical sleeve 15-2 is used to mount on the threaded element 15-1. The drive cable W passes through the hole 150 of the cylindrical sleeve 15-2, the threaded element 15-1, and the channel 145 of the second seat 14. Finally, the free end of the drive cable W is connected to the cylindrical sleeve member 7.

Figure 5:
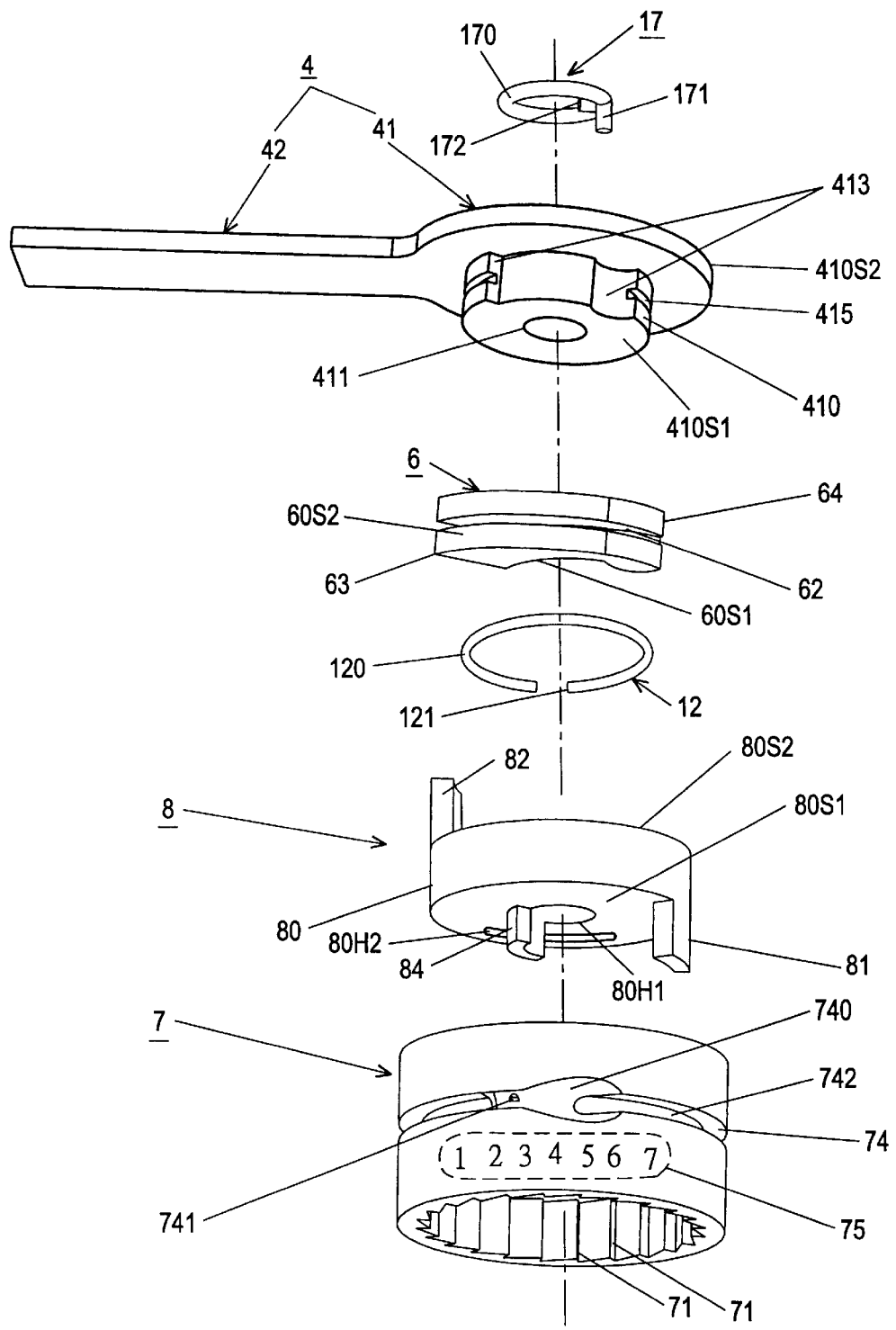
FIG. 5 is an enlarged perspective view showing elements located in a dotted line (Z1) with a different visual angle of FIG. 1C.

Referring to FIG. 5, a perspective view shows the elements located in a dotted line Z1 with a different visual angle of FIG. 1C.

As shown in FIG. 1C, the cylindrical sleeve member 7 is used to dispose in the container 14-1 and rotated about the shaft 141. The cylindrical sleeve member 7 has an inner wall 70 formed with three rows of teeth: first, second and third teeth 71, 72 and 73. The first teeth 71 and the second teeth 72 are spaced each other and regularly designed at all round of the inner wall 70, and the third teeth 73 located between the first teeth 71 and the second teeth 72 are partially designed at the inner wall 70. An annular slot 74 is formed on the outer wall of the cylindrical sleeve member 7, and a recess 740 and a positioning hole 741 is formed on the annular slot 74. The drive cable W guided in the hole 150 (FIG. 4) of the cylindrical sleeve 15-2 is rounded on the annular slot 74, and then the end of the drive cable W is knotted and fixed in the positioning hole 741 (not shown in FIGS.). The knotted drive cable W (not shown) can be received in the recess 740 so that possible interference, such as friction, can be prevented. A series of numbers from "1" to "7" marked with numeral 75 represent the shifting degrees of the present embodiment.

In FIG. 1C and FIG. 5, the resilient member 8, preferably made of rubber or other flexible material, is a traveling compensator that is pivoted about the shaft 141 and kept in the inner space of the cylindrical sleeve member 7. The resilient member 8 has a cylindrical body 80 formed with two through holes 80H1, 80H2, which are penetrated from its bottom surface 80S1 to the top surface 80S2. The through hole 80H1 is located at the middle of the cylindrical body 80, and the through hole 80H2 is a curved hole located between the through hole 80H1 and the sidewall of the cylindrical body 80. A first protrusion 81 and a second protrusion 82 are protruded from the bottom surface 80S1 and the top surface 80S2, respectively. A third protrusion 83 shown in FIG. 1C is formed on the sidewall of the cylindrical body 80 nearby the curved through hole 80H2. A fourth protrusion 84 shown in FIG. 5 protrudes from the bottom surface 80S1 and next to the through hole 80H1.

In FIG. 1C(FIG. 5), the first (second) shifting lever 3(4) is composed of a base plate 31(41) and an extension bar 32(42). The extension bar 32(42) can be wrapped by fitting itself in an opening 30' (40') of the rubber cover 3' (4'). A post 310(410) protrudes from the base plate 31(41), and a through hole 311(411) is penetrated from a first surface 310S1(410S1) to a second surface 310S2(410S2) of the base plate 31(41). The sidewall of the post 310(410) is formed with a curved recess 313(413) and a curved slot 315(415). In FIG. 1C, a positioning hole 316(416) is formed on the first (second) surface 310S1(410S2) next to the through hole 311(411).

In FIG. 1C(FIG. 5), the first (second) pawl 5(6) is formed with an inner curved surface 50S1(60S1) and an outer curved surface 50S2(60S2), and two slots 52(62) is formed on the outer curved surface 50S2(60S2) and formed on the inner curved surface 50S1(60S1), respectively. The two intersections of the inner curved surface 50S1(60S1) and the outer curved surface 50S2(60S2) are formed with first thrust ends 53(63) and second thrust ends 54(64), respectively.

In FIG. 1C, a first (second) spring 11(12) is a wire spring composed of a circular wire body 110(120) and a gap 111(121). A third (fourth) spring 16(17) is also made of wire spring which has a circular wire body 160(170) and two distal ends 161(171), 162(172). As shown in FIG. 5, the extension direction of the distal end 171 is different from the one of the distal end 172 of the fourth spring 17. The distal end 171 is extended toward the geometrical center of the circular wire body 170, and the extension direction of the distal end 172 is substantially perpendicular to the one of the distal end 171. The third spring 16 has the same structure as the fourth spring 17 but it's a small one.

In FIG. 5, the second pawl 6 is mounted on the second shifting lever 4 by the second spring 12, comprising the steps of: a) Disposing the second pawl 6 to the curved recess 413 of the second shifting lever 4 by contacting its inner curved surface 60S1 thereon. b) Adjusting the slot 62 of the second pawl 6 to align to the curved slot 415 of the second shifting lever 4. c) Enlarging the gap 121 of the second spring 12 with a predetermined range to allow it slides along the slot 62 of the second pawl 6 and the curved slot 415 of the second shifting lever 4. d) Finally, the second pawl 6 can be surely clamped on the post 410 by the second spring 12. With the constrain of the second spring 12, the outer curved surface 60S2 near the second thrust end 64 is juxtaposed to the circumferential surface is of the post 410, and the first thrust ends 63 is partially projected from the circumferential surface of the post 410. Relatively, the first pawl 5 also can be mounted on the first shifting lever 3 by the first spring 11 with the same way. The outer curved surface 50S2 near the second thrust end 54 is juxtaposed to the circumferential surface of the post 510, and the first thrust end 53 is partially projected from the circumferential surface of the post 310.

The installation of the aforementioned elements is depicted as following steps with reference to FIG. 1C.

First, the first shifting lever 3 is clamped with the first pawl 5 and the first spring 11 on the second seat 14. The first shifting lever 3 with its through hole 311 is fitted on the first step portion 141P1 of the shaft 141. The second surface 310S2 of the first shifting lever 3 contacts the bottom surface 140, and the first curved groove 141G1 and two holes 141H1(only one being shown) of the shaft 141 are just next to the first surface 310S1 of the first shifting lever 3. Thus, the L-shaped slot 142 (guiding slit 14G) as shown in FIG. 1A can use to limit the traveling of the shifting first shifting lever 3 (extension bar 32).

Second, the first shifting lever 3 is connected to the shaft 141 by the third spring 16. After fitting the circular wire body 160 of the third spring 16 on the shaft 141, the third spring 16 is tensed and then properly fitted on the first curved groove 141G1 of the shaft 141. One distal end 161 of the third spring 16 is positioned in the positioning hole 316 of the first shifting lever 3, and then another distal end 162 is tensely moved and fitted in the hole 141H1 of the shaft 141. Thus, the first shifting lever 3 can be tensely controlled by the third spring 16.

Third, the cylindrical sleeve member 7 is connected with the drive cable W (not shown in FIGS.) in the container 14-1. The cylindrical sleeve member 7 is disposed in the container 14-1 with its first teeth 71 engaging with the first thrust end 53 of the first pawl 5 clamped on the first shifting lever 3.

Fourth, the resilient member 8 is placed in the container 14-1. The resilient member 8 with its through hole 80H1 is fitted on the third step portion 141P3 of the shaft 141, and the fourth protrusion 84 of the resilient member 8 is positioned in the notch 141G0. The first protrusion 81 of the resilient member 8 is located around the post 310 of the first shifting lever 3, and the third protrusion 83 is engaged with the third teeth 73 of the cylindrical sleeve member 7.

Fifth, the second shifting lever 4 is clamped with the second pawl 6 and the second spring 12 on the second seat 14. The second shifting lever 4 with its through hole 411 is fitted on the third step portion 141P3 of the shaft 141. The first surface 410S1 (FIG. 5) of the second shifting lever 4 contacts the top surface 80S2 of the resilient member 8. Then, the second thrust end 63 of the second pawl 6 clamped on the second shifting lever 4 is engaged with the second teeth 72 of the cylindrical sleeve member 7. The second protrusion 82 of the resilient member 8 is located around the post 410 of the second shifting lever 4 as well as the clamped second pawl 6. The second curved groove 141G2 and two holes 141H2 (only one being shown) of the shaft 141 are just next to the second surface 410S2 of the first shifting lever 3.

Sixth, the second shifting lever 4 is connected to the shaft 141 by the fourth spring 17. After fitting the circular wire body 170 of the fourth spring 17 on the shaft 141, the fourth spring 16 is tensed and then properly is fitted on the second curved groove 141G2 of the shaft 141. One distal end 171 of the fourth spring 17 is positioned in the positioning hole 416 of the second shifting lever 4, and then another distal end 172 is tensely moved and fitted in the hole 141H2 of the shaft 141. Thus, the second shifting lever 4 can be tensely controlled by the fourth spring 17.

Last, the first seat 10 is connected to the second seat 14 as shown in FIG. 1A. The first seat 10 with its rectangular opening 100H is fitted on the rectangular end 141P5 of the shaft 141, and the annular flange 100C of the disk-like connecting portion 10-1 is disposed on the top end of the curved wall 140C of the second seat 14. Then, the first seat 10 can be fixedly connected to the second seat 14 by the bolt T1 screwing on the threaded hole 141H3 of the shaft 141 via the through hole 105 thereon. Thus, the traveling of the shifting second shifting lever 4 (extension bar 42) is limited by the curved recess 10G of the first seat 10, as shown in FIG. 1A.

After the above steps are completed, the relationships among the first pawl 5, the second pawl 6, the cylindrical sleeve member 7 and the resilient member 8 are shown as following. The first pawl 5 engaged with the first teeth 71 is pressed by the first protrusion 81, and the second pawl 6 engaged with the second teeth 72 is pressed by the second protrusion 82. As the shifting process is proceed, the first protrusion 81 is used to press the first pawl 5 to disengage from the first teeth 71, and the second protrusion 82 is used to press the second pawl 6 to disengage from the second teeth 72.

The assembly of the first teeth 71 of the cylindrical sleeve member 7 and the first pawl 5 clamped on the first shifting lever 3 is used as a ratchet mechanism for a high gear of the bicycle speed control apparatus of the present invention. The assembly of the second teeth 72 of the cylindrical sleeve member 7 and the second pawl 6 clamped on the second shifting lever 4 is used as another ratchet mechanism for a low gear of the bicycle speed control apparatus of the present invention. The third teeth 73 of the cylindrical sleeve member 7 function as the positioning slot so as to prevent the third protrusion 83 of the resilient member 8 from being disengaged while the degree of shifting is determined.

In FIG. 5, the annular slot 74 is used as a path to guide the drive cable W, and the design of the annular slot 74 can precisely determine the tract feed of the drive cable W and effectively reduce the frictional resistance from the cylindrical sleeve member 7. A cylindrical base 742 is formed on the bottom of the annular slot 74 of the cylindrical sleeve member 7. The radius of the cylindrical base 742 precisely determines the tract feed of the drive cable W. The intervals of the degree of shifting, tract force of the drive cable W, and the lever portion of shifting.

Second Embodiment

Figure 6A:
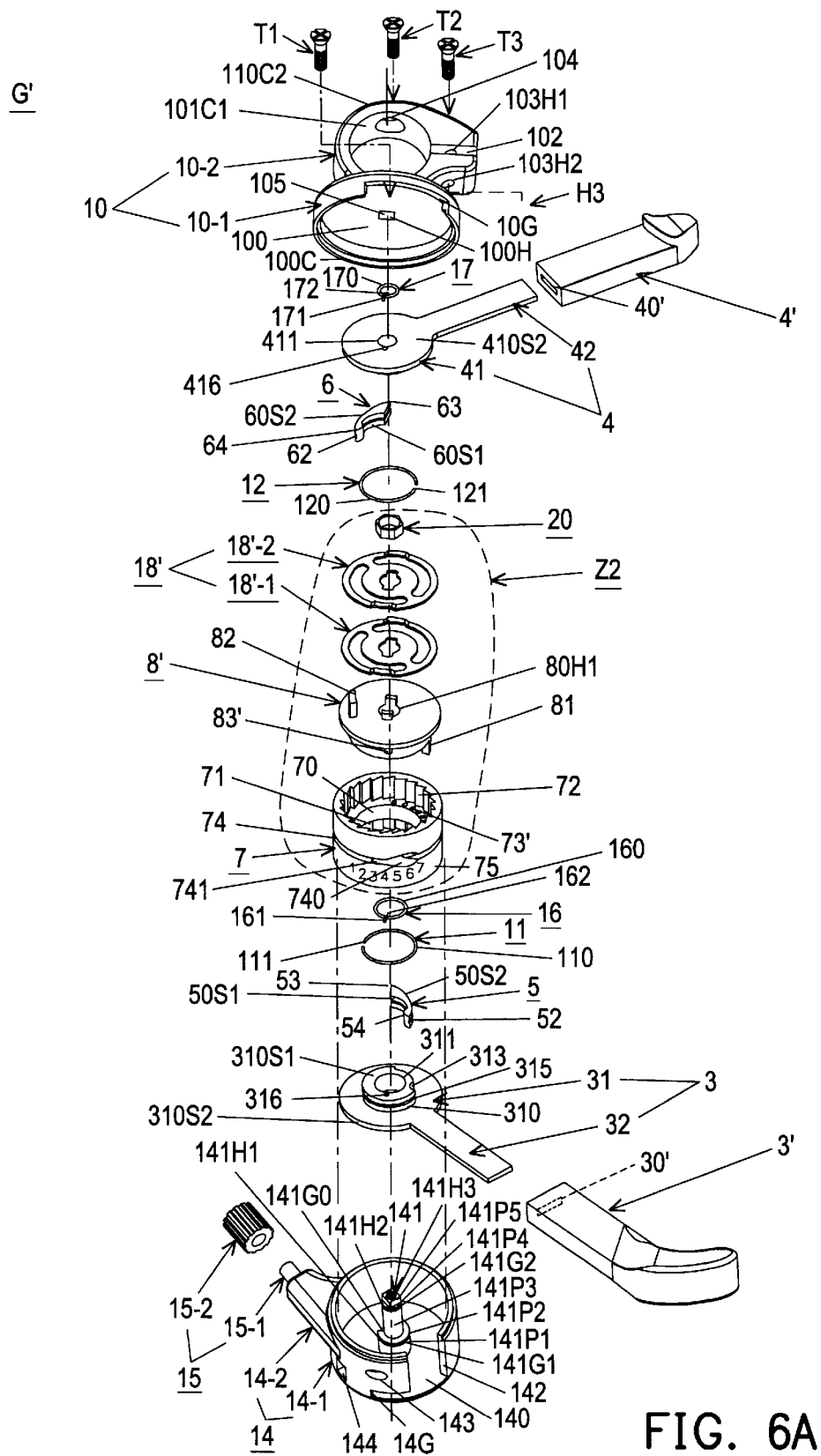
FIG. 6A is an exploded perspective view showing all the element of a bicycle speed control apparatus (G') according to a second embodiment of the present invention.

FIG. 6A is an exploded perspective view showing all the elements of a bicycle speed control apparatus G'.

The second embodiment is identical to the first embodiment except as follows. In FIG. 6A, the bicycle speed control apparatus G' is further provided with a thrusting element 18', another cylindrical sleeve member 7' and another resilient member 8'. The thrusting element 18' is used to support the axial force and is composed of two disk-like springs 18'-1(18'-2), which are juxtaposed and disposed between the resilient member 8' and the second shifting lever 4 and fixed on the shaft 141 by a bolt 20. The other elements shown in FIG. 6A are all the same as the corresponding elements shown in FIG. 1A and also the corresponding symbols of these elements are adopted.

Figure 6B:
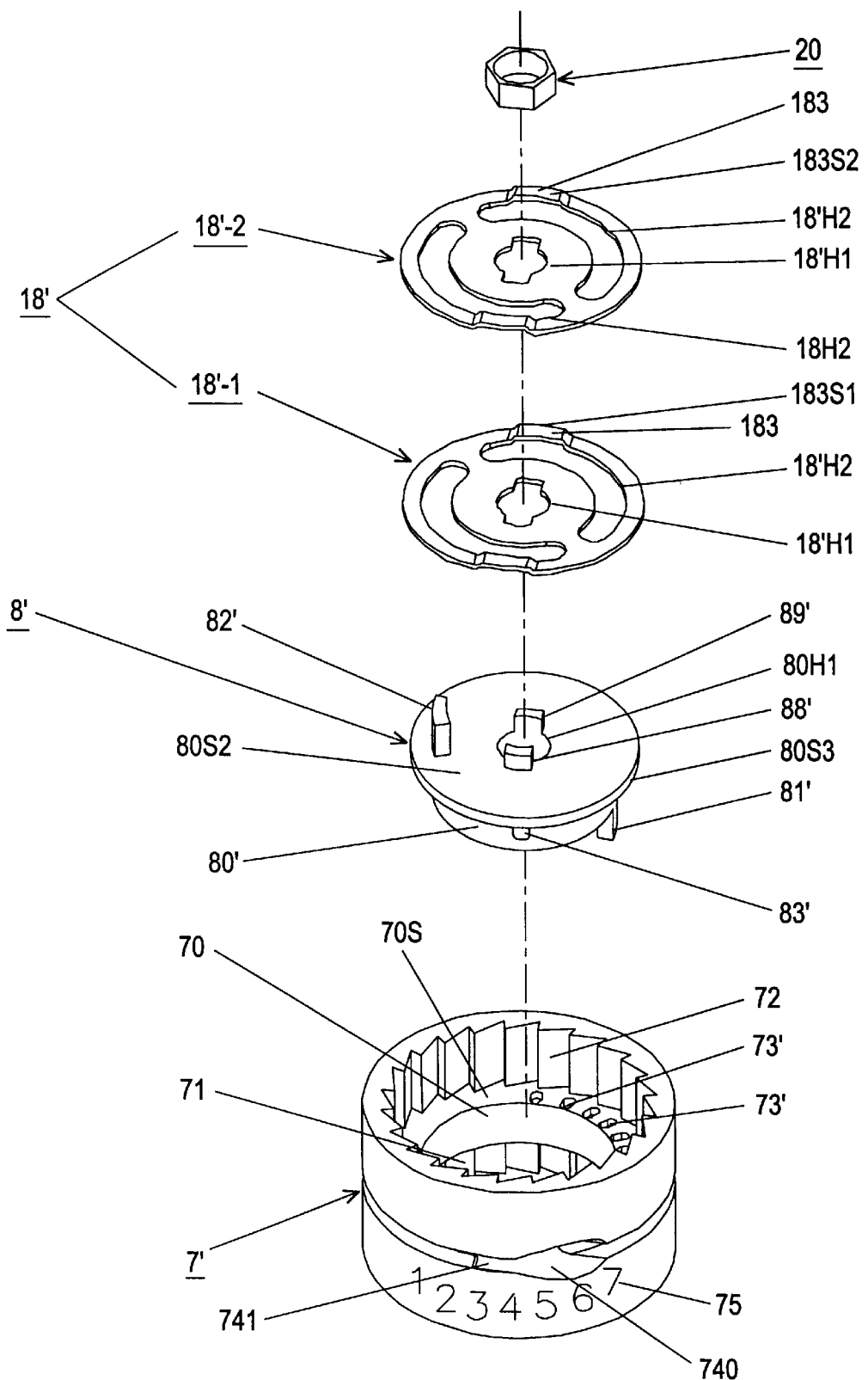
FIG. 6B is an enlarged perspective view of elements in a dotted line (Z2) of FIG. 6A.
Figure 6C:
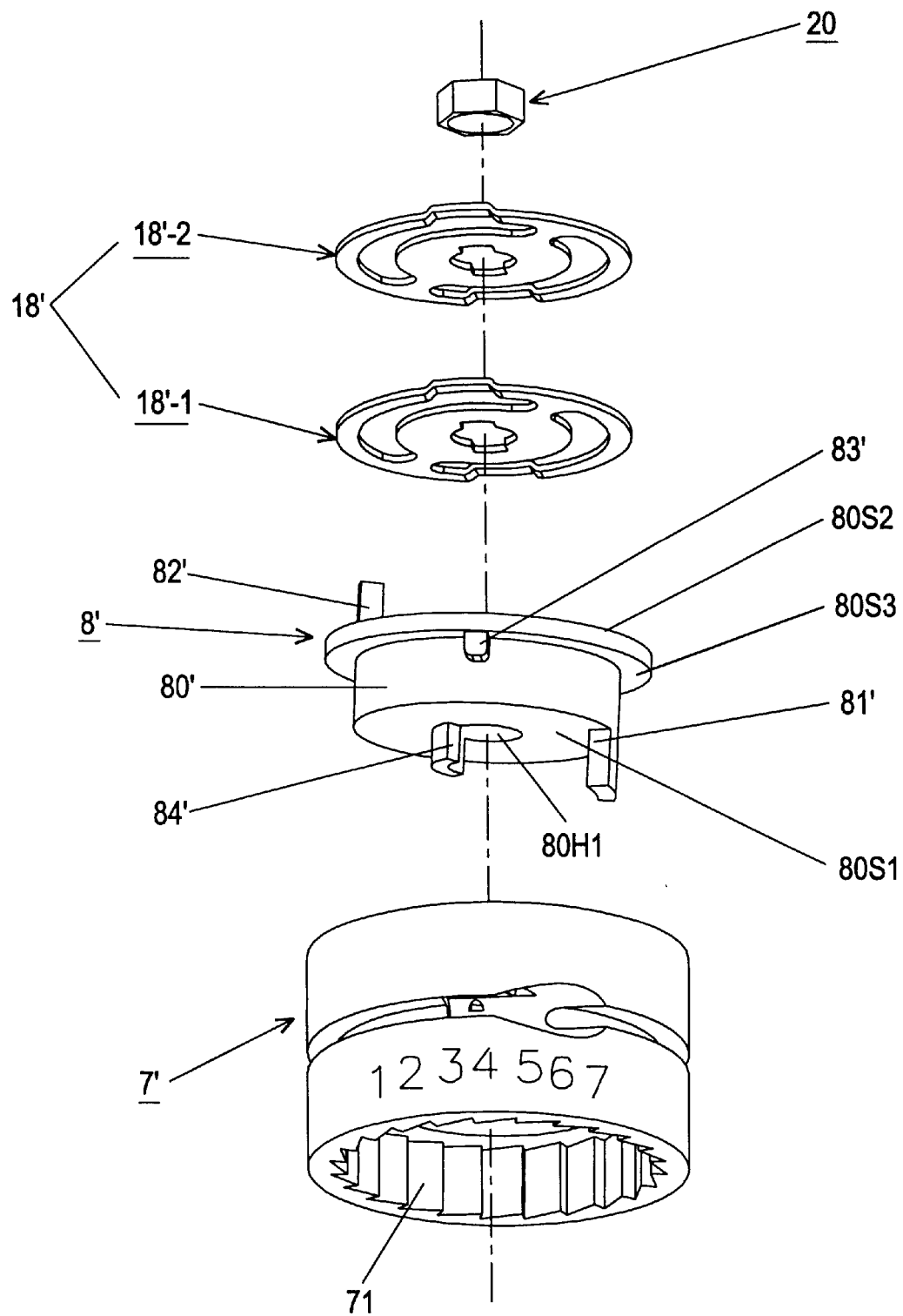
FIG. 6C is a perspective view with a different visual angle according to FIG. 6B.

FIG. 6B is an enlarged perspective view showing the elements in a dotted line Z2 of FIG. 6A, and FIG. 6C is a perspective view with a different visual angle according to FIG. 6B.

In FIG. 6B and FIG. 6C, the resilient member 8' comprises a cylindrical body 80', a first protrusion 81', a second protrusion 82', a third protrusion 83', a fourth protrusion 84' (FIG. 6C), a fifth protrusion 88' and a sixth protrusion 89'. The cylindrical body 80' has a bottom surface 80S1, a top surface 80S2 and a step surface 80S3, and a through hole 80H1 is centrally penetrated from the bottom surface 80S1 to top surface 80S2. The step surface 80S3 is extended from the sidewall of the cylindrical body 80' and is located between the bottom surface 80S1 to the top surface 80S2. The first protrusion 81' and the second protrusion 82' are respectively protruded from the bottom surface 80S1 and the top surface 80S2, and the third protrusion 83' is upwardly protruded from the step surface 80S3. The fourth protrusion 84' (shown in FIG. 6C) protrudes from the bottom surface 80S1 and next to the through hole 80H1. The fifth protrusion 88' and the sixth protrusion 89' in FIG. 6B are corresponding and protruded from the bottom surface 80S1 next to the through hole 80H1. The function of the first protrusion 81', the second protrusion 82', the third protrusion 83' and the fourth protrusion 84' are the same as the first protrusion 81, the second protrusion 82, the third protrusion 83 and the fourth protrusion 84 of the resilient member 8 of the first embodiment.

In FIG. 6B, the two disk-like springs 18'-1(18'-2) are the same one and has a bottom surface 183S1 and a top surface 183S2. Each of two disk-like springs 18'-1(18'-2) has a central hole 18'H1, two spaced curved holes 18'H2 and two punching portions 183(183), and the two punching portions 183(183) are indented on the bottom surface 183S1 and next to the flange thereof.

In FIG. 6B, the cylindrical sleeve member 7' differs from the cylindrical sleeve member 7 in that the third teeth 73 in the cylindrical sleeve member 7 replace recesses 73'. A step surface 70S is provided in the inner wall 70 of the cylindrical sleeve member 77, and the spaced recess 73' are formed on the step surface 70S.

As all the elements of the bicycle speed control apparatus G' are assembled, the third protrusion 83' of the resilient member 8' is received in one of the recesses 73'. The two disk-like springs 18'-1(18'-2) are juxtaposed with the engagement of the corresponding punching portions 183 (183) and disposed together on the top surface 80S2 of the resilient member 8'. The central holes 18'H1 of the two disk-like springs 18'-1(18'-2) are fitted with the fifth protrusion 88' and the sixth protrusion 89', the second protrusion 82' is received in one curved hole 18'H2 of each two disk-like springs 18'-1(18'-2).

Third Embodiment

Figure 7A:
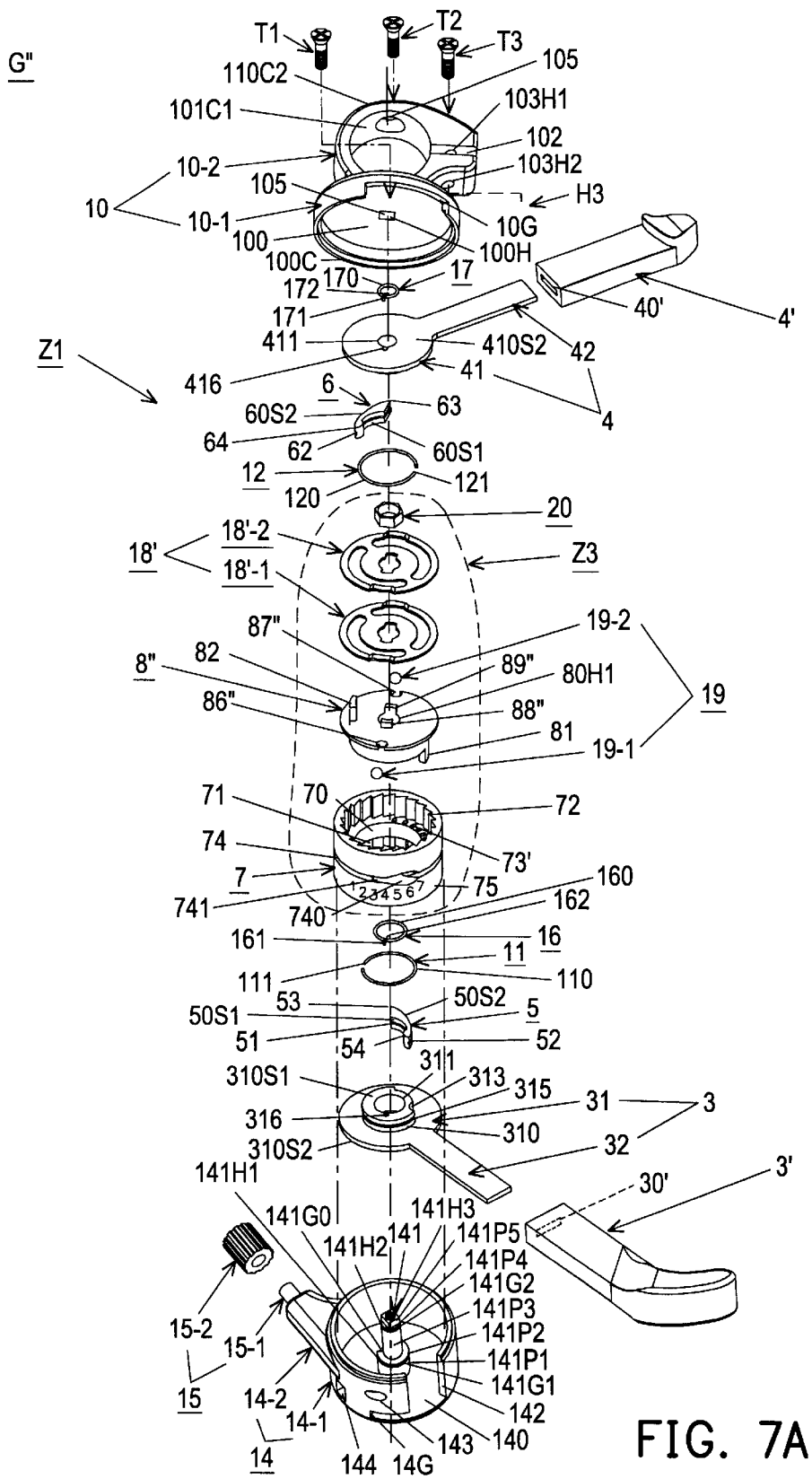
FIG. 7A is an exploded perspective view of all the elements of a bicycle speed control apparatus (G") according to a third embodiment of the present invention.

FIG. 7A is an exploded perspective view of all the elements of a bicycle speed control apparatus G".

The second embodiment is identical to the first embodiment except as follows. In FIG. 7A, the bicycle speed control apparatus G" is further provided with two rolling elements 19-1(19-2) and another resilient member 8". The other elements shown in FIG. 8A are all the same as the corresponding elements shown in FIG. 6A and also the corresponding symbols of these elements are adopted. Each of the rolling elements 19-1(19-2) is made of steel ball and formed with the same size.

Figure 7B:
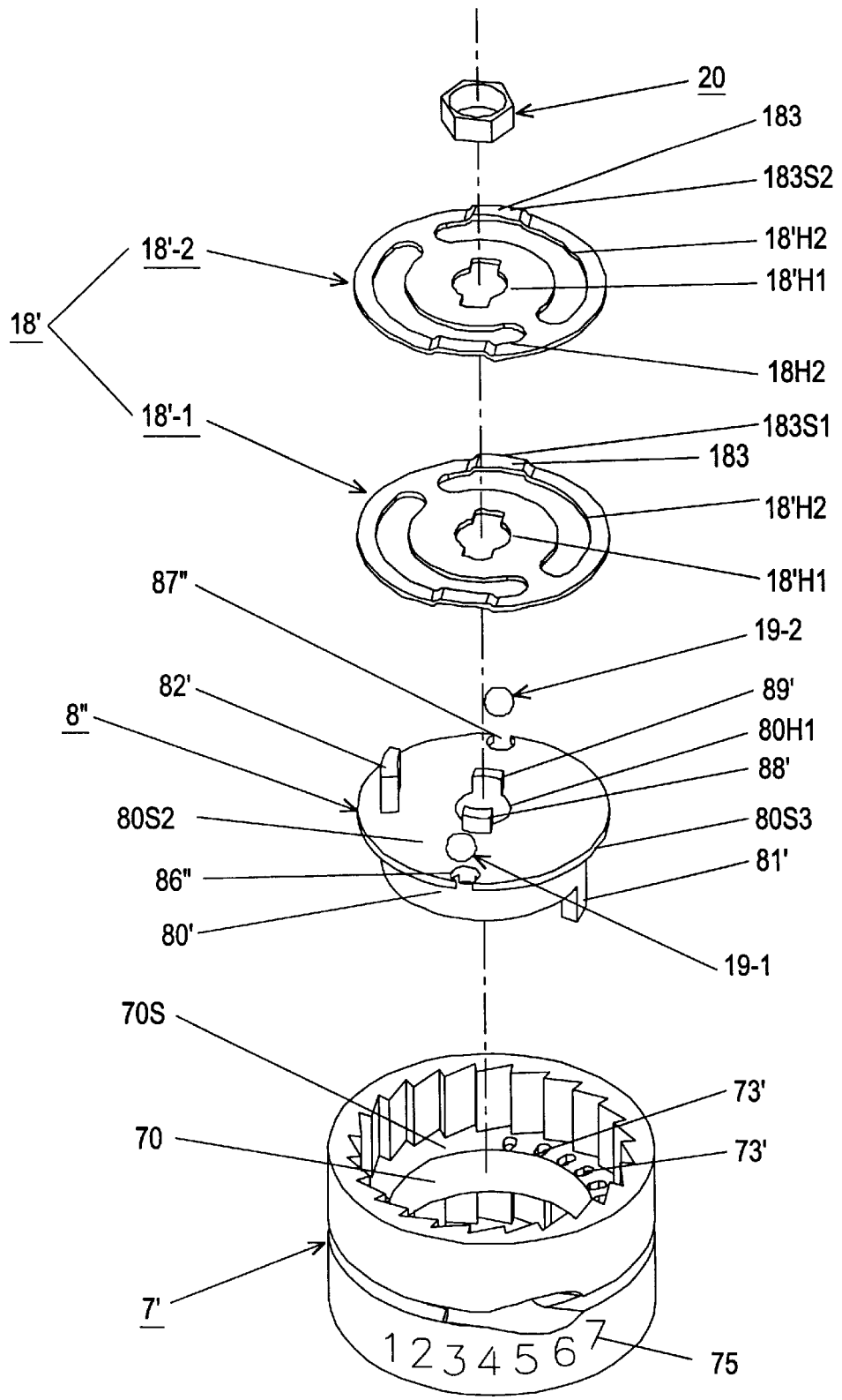
FIG. 7B is an enlarged perspective view of elements in a dotted line (Z3) of FIG. 7A.
Figure 7C:
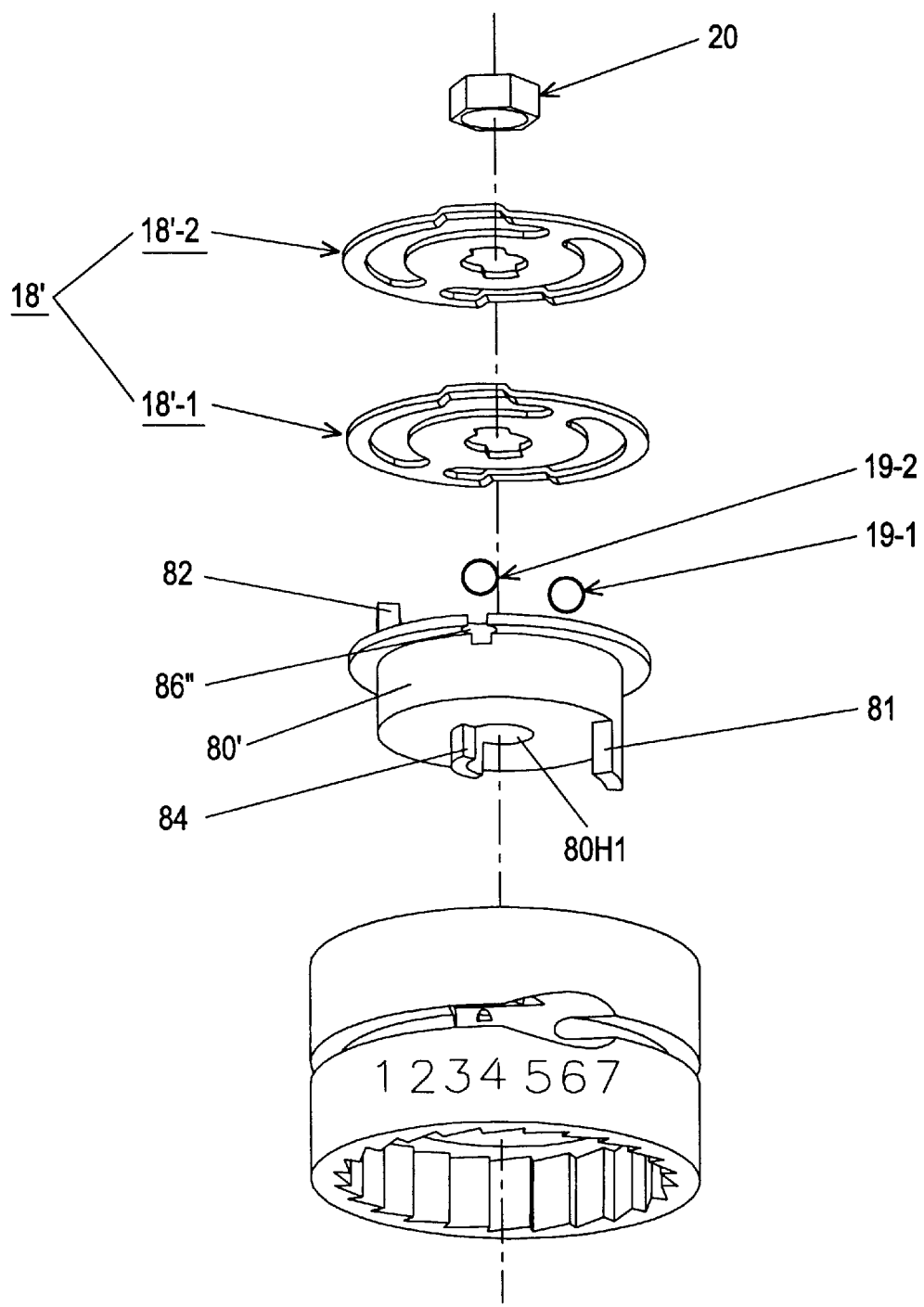
FIG. 7C is a perspective view with a different visual angle according to FIG. 7B.

FIG. 6B is an enlarged perspective view showing the elements in a dotted line Z3 of FIG. 7A, and FIG. 7C is a perspective view with a different visual angle according to FIG. 7B.

The resilient member 8" differs from the resilient member 8' in that the third protrusion 83' of the resilient member 8' is removed and replaced with two openings 86" (87"). The openings 86" (87") are spaced each other and formed by penetrating on the top surface 80S2 to the step surface 80S3, and the size of each openings 86" (87") is small than the diameter of each of the rolling elements 19-1(19-2). The rolling elements 19-1(19-2) are respectively used to received in two openings 86" (87") from the top surface 80S2 of the resilient member 8".

As all the elements of the bicycle speed control apparatus G" are assembled, the two rolling elements 19-1(19-2) received in the two openings 86" (87") respectively are clamped by the thrusting element 18' and the resilient member 8", and the two rolling elements 19-1(19-2) are respectively pressed and accommodated by the two punching portions 183 and 183 of the disk-like spring 18'-1. Thus, the two rolling elements 19-1(19-2) can be held tightly by the two juxtaposed disk-like spring 18'-1(18'-2) while they are moved. The positioned rolling elements 19-1(19-2) are protruded from the step surface 80S3. The several recesses 73' of the cylindrical sleeve member 7' can be alternatively positioned by the two positioned rolling elements 19-1(19-2) when undergoing the shifting process, and unpredictable abnormal shifting can be avoided.

As the rider starts to shift by pushing or pulling the first shifting lever 3 and the second shifting lever 4, the cylindrical sleeve member 7' is actuated by the acting pawl (first pawl 5 or second pawl 6), the cylindrical sleeve member 7' is rotated and when the two rolling elements 19-1(19-2) held by the juxtaposed disk-like springs 18'-1(18'-2) are disengaged from the initial recesses 73' they are received by the rotating cylindrical sleeve member 7' and temporarily located at the step surface 70S before they arrive the another two recesses 73'. The juxtaposed disk-like springs 18'-1(18'-2) are deformedly pressed and rotated by the two rolling elements 19-1(19-2), and they will be positioned again and restored to the initial state when the two positioned rolling elements 19-1(19-2) are engaged with the next two recesses 73'.

Because most elements of the present invention are simply assembled on the shaft 141 along its axial direction, the assembled speed control apparatus has high-rigidity, and therefore the coupling force between the resilient member and the positioning recesses can be engaged.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A bicycle speed control apparatus for controlling a gear transmission mechanism via a drive cable connected to a bicycle, comprising:

a first seat having a connecting portion for mounting on the bicycle and a positioning hole thereon;

a second seat connected to the first seat, having a shaft positioned in the positioning hole;

a cylindrical sleeve member movably disposed about the shaft and connected to an end of the drive cable, having an inner wall provided with first teeth, second teeth and third teeth located between the first teeth and the second teeth in parallel;

a first shifting lever pivoted about the shaft, having a hole receiving the shaft;

a first pawl mounted on the first shifting lever, having a first thrust end for engaging the first teeth;

a second shifting lever pivoted about the shaft, having a hole fitted with the shaft;

a second pawl mounted on the second shifting lever, having a second thrust end for engaging the second teeth; and a resilient member positioned by the shaft for engaging the third teeth and disengaging the first pawl from the first teeth and disengaging the second pawl from the second teeth, formed with a first protrusion for pressing the first pawl to disengage from the first teeth and a second protrusion for pressing the second pawl to disengage from the second teeth and a third protrusion for engaging the third teeth.

2. The bicycle speed control apparatus as claimed in claim 1 further comprising a regulator connected to the drive cable for adjusting the tension of the drive cable.

3. The bicycle speed control apparatus as claimed in claim 2, wherein the first pawl is mounted on the first shifting lever by a first spring, and the second pawl is mounted on the second shifting lever by a second spring.

4. The bicycle speed control apparatus as claimed in claim 3, wherein the first shifting lever is connected to the shaft by a third spring, and the second shifting lever is connected to the shaft by a fourth spring.

5. The bicycle speed control apparatus as claimed in claim 4 further comprising at least two disk-like springs disposed between the second shifting lever and the resilient member, each of which is provided with at least two step portions, wherein the third teeth comprise a series of recesses.

6. The bicycle speed control apparatus as claimed in claim 5, wherein the resilient member is made of rubber.

7. A bicycle speed control apparatus for controlling a gear transmission mechanism via a drive cable connected to a bicycle, comprising:

a first seat having a connecting portion used to mount on the bicycle and a positioning hole thereon;

a second seat connected to the first seat, having a shaft positioned in the positioning hole;

a cylindrical sleeve member movably disposed about the shaft and connected to an end of the drive cable, having an inner wall provided with first teeth, second teeth and third teeth located between the first teeth and the second teeth in parallel;

a first shifting lever pivoted about the shaft, having a hole receiving the shaft;

a first pawl mounted on the first shifting lever, having a first thrust end for engaging the first teeth;

a second shifting lever pivoted about the shaft, having a hole fitted with the shaft;

a second pawl mounted on the second shifting lever, having a second thrust end for engaging the second teeth;

a resilient member positioned by the shaft for engaging the third teeth and disengaging the first pawl from the first teeth and disengaging the second pawl from the second teeth, formed with a first protrusion for pressing the first pawl to disengage from the first teeth and a second protrusion for pressing the second pawl to disengage from the second teeth and a third protrusion for engaging the third teeth; and a regulator connected to the drive cable for adjusting the tension of the drive cable.

8. The bicycle speed control apparatus as claimed in claim 7, wherein the first pawl is mounted on the first shifting lever by a first spring, and the second pawl is mounted on the second shifting lever by a second spring.

9. The bicycle speed control apparatus as claimed in claim 8, wherein the first shifting lever is connected to the shaft by a third spring, and the second shifting lever is connected to the shaft by a fourth spring.

10. The bicycle speed control apparatus as claimed in claim 9 further comprising at least two disk-like springs disposed between the second shifting lever and the resilient member, each of which is provided with at least two step portions, wherein the third teeth comprise a series of recesses.

11. A bicycle speed control apparatus for controlling a gear transmission mechanism via a drive cable connected to a bicycle, comprising:

a first seat having a connecting portion for mounting on the bicycle and a positioning hole thereon;

a second seat connected to the first seat, having a shaft positioned in the positioning hole;

a cylindrical sleeve member movably disposed about the shaft and connected to an end of the drive cable, having an inner wall provided with first teeth, second teeth and third teeth located between the first teeth and the second teeth in parallel;

a first shifting lever pivoted about the shaft, having a hole receiving the shaft;

a first pawl mounted on the first shifting lever, having a first thrust end for engaging the first teeth;

a second shifting lever pivoted about the shaft, having a hole fitted with the shaft;

a second pawl mounted on the second shifting lever, having a second thrust end for engaging the second teeth; and a resilient member positioned by the shaft for engaging the third teeth and disengaging the first pawl from the first teeth and disengaging the second pawl from the second teeth, formed with a first protrusion for pressing the first pawl to disengage from the first teeth and a second protrusion for pressing the second pawl to disengage from the second teeth and engaging means for engaging the third teeth.

12. The bicycle speed control apparatus as claimed in claim 11, wherein the third teeth comprise a series of recesses, and the engaging means comprise two openings provided through the resilient member, further comprising two ball-like elements which are movably disposed between the resilient member and two disk-like springs.

13. The bicycle speed control apparatus as claimed in claim 12, wherein the resilient member is made of rubber.

14. The bicycle speed control apparatus as claimed in claim 11, wherein the third teeth comprise a series of recesses, and the engaging means comprise two openings provided through the resilient member, further comprising two ball-like elements which are movably disposed between the resilient member and two disk-like springs.

15. The bicycle speed control apparatus as claimed in claim 14, wherein the resilient member is made of rubber.

* * * * *